US010322817B2

(12) United States Patent
Vawter et al.

(10) Patent No.: US 10,322,817 B2
(45) Date of Patent: Jun. 18, 2019

(54) IMPACT VELOCITY REDUCTION BY MASS EJECTION

(71) Applicant: Kitty Hawk Corporation, Mountain View, CA (US)

(72) Inventors: Zachais Vawter, Sunnyvale, CA (US); Todd Reichert, Mountain View, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 15/879,166

(22) Filed: Jan. 24, 2018

(65) Prior Publication Data

US 2018/0162552 A1    Jun. 14, 2018

Related U.S. Application Data

(63) Continuation of application No. 15/167,424, filed on May 27, 2016, now Pat. No. 9,908,638.

(51) Int. Cl.
| | |
|---|---|
| *B64C 39/00* | (2006.01) |
| *B64D 45/04* | (2006.01) |
| *G05D 1/10* | (2006.01) |
| *B64D 25/08* | (2006.01) |
| *B64D 17/72* | (2006.01) |
| *B64D 17/80* | (2006.01) |
| *B64C 39/02* | (2006.01) |
| *B64D 1/10* | (2006.01) |
| *B64D 1/12* | (2006.01) |
| *B64D 45/00* | (2006.01) |

(52) U.S. Cl.
CPC ............ *B64D 45/04* (2013.01); *B64C 39/024* (2013.01); *B64D 1/10* (2013.01); *B64D 1/12* (2013.01); *B64D 17/725* (2013.01); *B64D 17/80* (2013.01); *B64D 25/08* (2013.01); *G05D 1/101* (2013.01); *B64C 2201/042* (2013.01); *B64C 2201/185* (2013.01); *B64D 2045/008* (2013.01)

(58) Field of Classification Search
USPC ................................ 701/3–18; 244/138, 139
See application file for complete search history.

(56) References Cited

U.S. PATENT DOCUMENTS

| | | | | |
|---|---|---|---|---|
| 6,144,899 A | * | 11/2000 | Babb ...................... | B64C 13/18 102/384 |
| 6,392,213 B1 | * | 5/2002 | Martorana ............ | B64C 39/024 244/13 |
| 6,868,314 B1 | * | 3/2005 | Frink ........................ | B64C 1/00 701/3 |

(Continued)

FOREIGN PATENT DOCUMENTS

CA          2469680          7/2003

*Primary Examiner* — Jonathan L Sample
(74) *Attorney, Agent, or Firm* — Van Pelt, Yi & James LLP

(57) ABSTRACT

A ballistic parachute associated with an aircraft is deployed where the aircraft includes a first part and a second part, the two parts are detachably coupled to each other when the ballistic parachute is deployed, and the ballistic parachute is coupled to the first part of the aircraft. A landing zone associated with the second part of the aircraft is determined and it is decided whether to decouple the two parts, including by deciding whether the landing zone associated with the second part of the aircraft is inhabited. If it is decided to decouple the two parts from each other, they are decoupled from each other.

9 Claims, 8 Drawing Sheets

(56) References Cited

U.S. PATENT DOCUMENTS

| | | | |
|---|---|---|---|
| 7,210,654 B1* | 5/2007 | Cox | B64C 39/024 244/190 |
| 8,538,605 B1* | 9/2013 | Riley | F42B 10/64 244/3.1 |
| 8,788,127 B1* | 7/2014 | Waldo | B64D 1/02 244/137.3 |
| 9,174,733 B1* | 11/2015 | Burgess | B64D 1/12 |
| 9,488,979 B1* | 11/2016 | Chambers | G05D 1/0088 |
| 9,580,173 B1* | 2/2017 | Burgess | B64C 39/024 |
| 9,645,582 B2* | 5/2017 | Shue | G05D 1/105 |
| 9,747,808 B2* | 8/2017 | Chambers | B64C 39/024 |
| 9,908,638 B1* | 3/2018 | Vawter | G05D 1/101 |
| 2003/0155463 A1* | 8/2003 | Cox | B64C 39/024 244/3.1 |
| 2003/0197095 A1 | 10/2003 | Preston | |
| 2004/0135031 A1* | 7/2004 | Stupakis | B64C 39/02 244/120 |
| 2006/0011777 A1* | 1/2006 | Arlton | B64C 27/10 244/7 B |
| 2006/0032984 A1* | 2/2006 | Preston | G07F 17/32 244/152 |
| 2009/0205845 A1* | 8/2009 | Hoffman | A62C 3/025 169/43 |
| 2009/0308979 A1* | 12/2009 | Nadir | B64C 39/024 244/147 |
| 2010/0004803 A1* | 1/2010 | Manfredi | B64D 25/00 701/14 |
| 2011/0035149 A1* | 2/2011 | McAndrew | G05D 1/0038 701/466 |
| 2011/0139928 A1* | 6/2011 | Morris | B64C 27/02 244/1 TD |
| 2012/0145833 A1* | 6/2012 | McCann | B64D 17/025 244/151 A |
| 2013/0048787 A1* | 2/2013 | Riley | B64D 1/08 244/137.1 |
| 2013/0311009 A1 | 11/2013 | McAndrew | |
| 2014/0339372 A1* | 11/2014 | Dekel | B64C 29/0033 244/7 R |
| 2015/0197335 A1* | 7/2015 | Dekel | B64C 29/0033 701/5 |
| 2015/0276353 A1* | 10/2015 | Ueno | F41H 7/04 244/2 |
| 2015/0314881 A1* | 11/2015 | Tsaliah | B64D 17/72 244/146 |
| 2016/0028471 A1* | 1/2016 | Boss | H04W 84/06 455/406 |
| 2016/0068267 A1* | 3/2016 | Liu | B64C 39/024 701/11 |
| 2016/0107750 A1* | 4/2016 | Yates | B64C 39/024 244/2 |
| 2016/0163204 A1* | 6/2016 | Raptopoulos | G08G 5/0069 701/3 |
| 2016/0207637 A1* | 7/2016 | Campillo | B64C 39/024 |
| 2016/0214715 A1* | 7/2016 | Meffert | B64C 39/024 |
| 2016/0253908 A1* | 9/2016 | Chambers | B64C 39/024 701/2 |
| 2016/0332739 A1* | 11/2016 | Wong | B64C 39/00 |
| 2016/0347462 A1* | 12/2016 | Clark | B64C 39/024 |
| 2016/0368610 A1* | 12/2016 | Erickson | B64D 25/00 |
| 2016/0378121 A1* | 12/2016 | Shue | G05D 1/105 701/7 |
| 2017/0066537 A1* | 3/2017 | Mitchell | B64D 17/80 |
| 2017/0129603 A1* | 5/2017 | Raptopoulos | B64C 39/024 |

* cited by examiner

IMPACT VELOCITY REDUCTION BY MASS EJECTION

CROSS REFERENCE TO OTHER APPLICATIONS

This application is a continuation of co-pending U.S. patent application Ser. No. 15/167,424, entitled IMPACT VELOCITY REDUCTION BY MASS EJECTION filed May 27, 2016 which is incorporated herein by reference for all purposes.

BACKGROUND OF THE INVENTION

Aircraft vary widely both in the altitudes at which they fly and in their weights. For example, commercial airliners (e.g., manufactured by Boeing or Airbus) may weigh as much as hundreds of metric tons and may have a cruising altitude in the range of 30,000-40,000 ft. In contrast, the small unmanned aerial system (UAS) category of drones (which the FAA is currently drafting rules for) weigh in the range of 4.4-55 pounds and current FAA draft rules propose limiting such drones to a maximum altitude of 500 feet above ground level.

All types of aircraft, including drones, occasionally need to perform emergency landings. New emergency landing solutions may be developed for drones which were never developed for other types of aircraft because of the differences in altitude, differences in weight, etc. Such emergency landing solutions would be useful because they may prevent damage to the drone in the event of an emergency landing and/or to any pilots or passengers on board the drone. Naturally, such emergency landing solutions are not necessarily limited to drones and may be applicable to other, similar types of aircraft (e.g., lighter-weight, flying at lower altitudes, etc.).

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
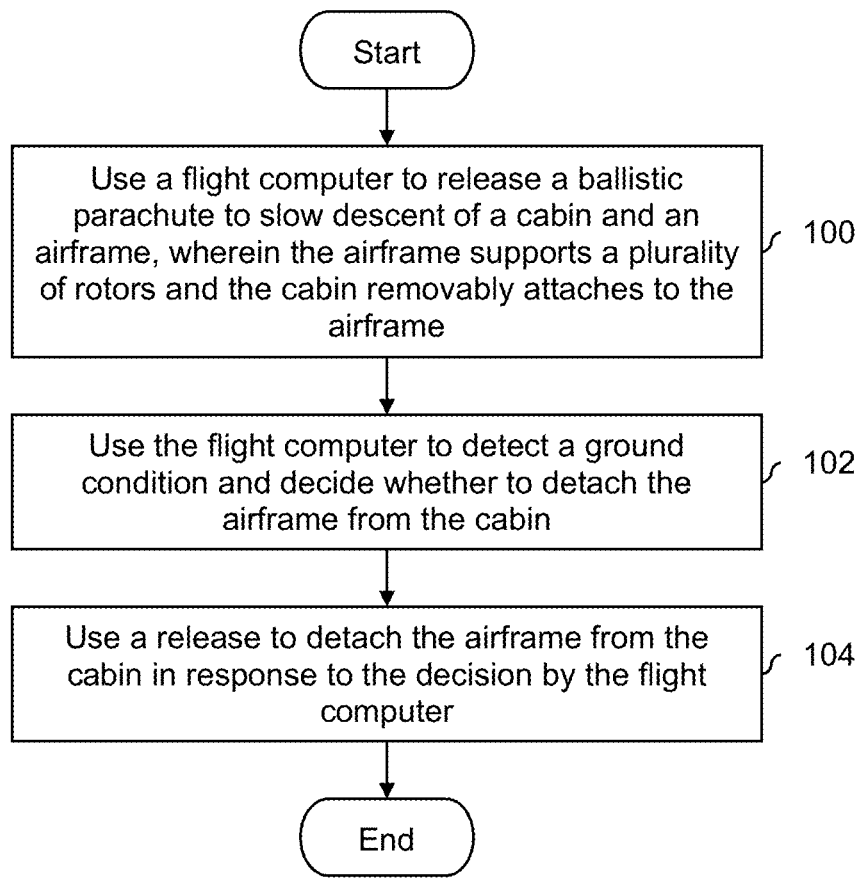
FIG. 1 is a flowchart illustrating an embodiment of a process to safely detach an airframe from a cabin based on ground condition.

FIG. 1 is a flowchart illustrating an embodiment of a process to safely detach an airframe from a cabin based on ground condition. The process of FIG. 1 is triggered in the event the aircraft becomes disabled and/or an emergency landing becomes necessary.

At 100, a flight computer is used to release a ballistic parachute to slow descent of a cabin and an airframe, wherein the airframe supports a plurality of rotors and the cabin removably attaches to the airframe. In some embodiments, the process of FIG. 1 is performed by a drone (or, more generally, an aircraft) which may be manned (i.e., with a pilot in the cabin) or unmanned (i.e., without a pilot in the cabin). Drones tend to fly lower to the ground than other types of aircraft and as such a ballistic parachute is preferred over a parachute with a passive release mechanism since the lower altitude of a drone requires a faster parachute deployment time. To put it another way, aircraft that fly at higher altitudes have more time before hitting the ground for their parachute to deploy and "catch" in the air during descent.

At 102, the flight computer is used to detect a ground condition and decide whether to detach an airframe from a cabin. As an example of step 102, the ground condition which is detected by the flight computer is for or is otherwise associated with a landing zone (e.g., an impact site, plus some area around the impact site in order to account for positional error and/or post-impact rolling) where the flight computer projects or otherwise estimates that the airframe will land if detached. In such embodiments, the flight computer decides whether or not to detach the airframe from the cabin based on the ground condition of the landing zone, specifically whether or not the landing zone is (e.g., statistically and/or historically likely to be) inhabited.

In some embodiments, the flight computer makes a real-time decision about whether or not the landing zone is inhabited. For example, as will be described in more detail below, the aircraft may include thermal imaging technology which the flight computer uses to decide if the projected landing zone of the airframe is inhabited. Alternatively, the flight computer may make a decision (e.g., based on historical or statistical information) about whether the projected landing zone of the airframe is likely or unlikely to be inhabited. For example, the flight computer may estimate a population density for the projected landing zone of the airframe, and if the population density is less than some threshold, then the airframe is detached from the cabin.

At 104, a release is used to detach the airframe from the cabin in response to the decision by the flight computer. In some embodiments, the release is an active release mechanism such as that offered by an explosive bolt (e.g., manufactured by the Ensign-Bickford Aerospace & Defense Company or the Pacific Scientific Energetic Materials Company). Alternatively, in some embodiments, the release is a passive release mechanism. For example, a latch may release the downward-facing airframe from the cabin. Since the parachute is connected to the cabin, the airframe will fall at a faster rate of speed while the cabin has a slower descent.

The following figure shows an example of an aircraft which performs the process of FIG. 1.

Figure 2:
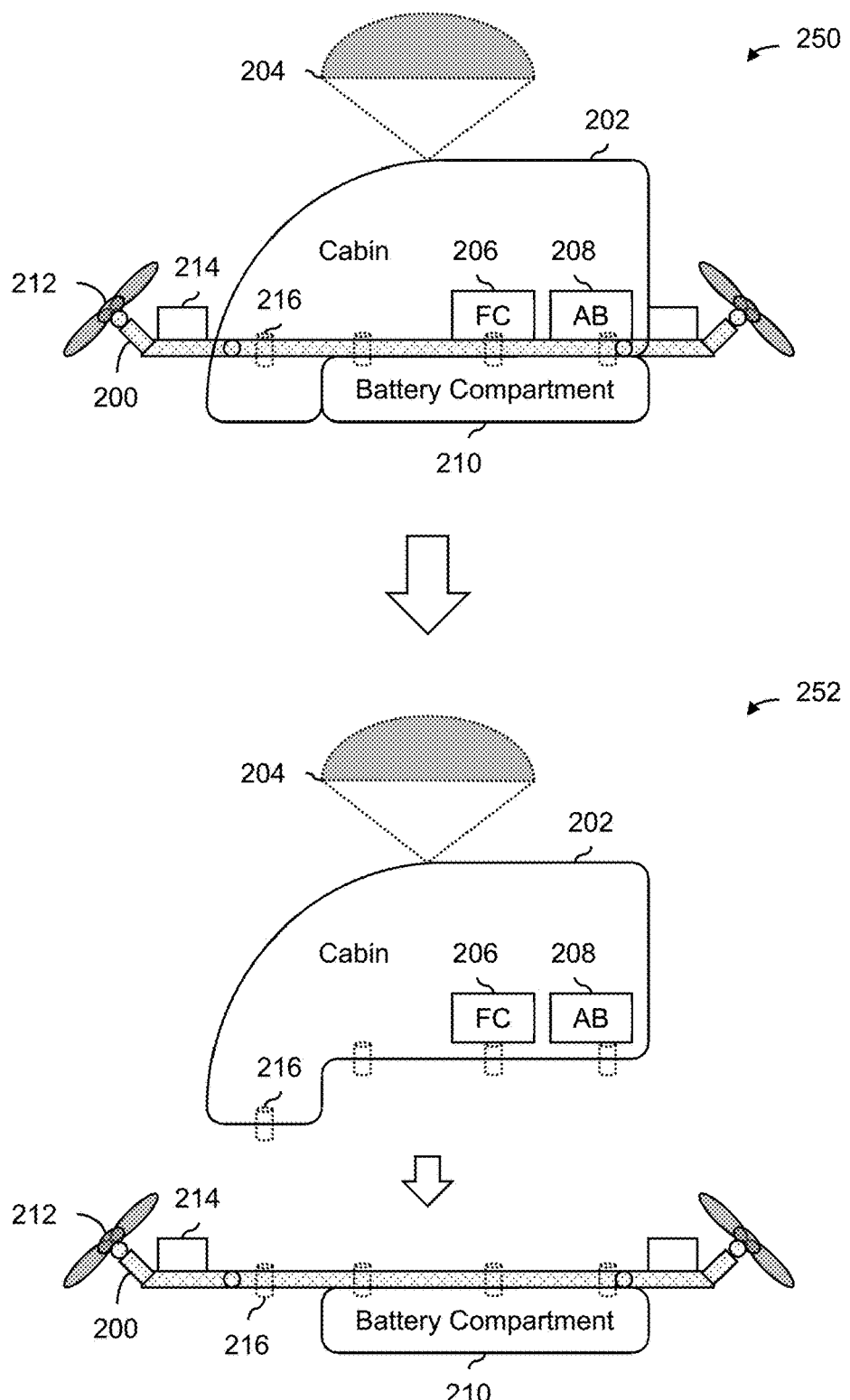
FIG. 2 is a diagram illustrating an embodiment of an aircraft before and after an airframe is detached from a cabin.

FIG. 2 is a diagram illustrating an embodiment of an aircraft before and after an airframe is detached from a cabin. In the example shown, diagram 250 shows the exemplary aircraft before the airframe (200) and cabin (202) separate and diagram 252 shows the exemplary aircraft after the airframe (200) and cabin (202) have separated. It is noted that this figure is merely exemplary and is not intended to be limiting. For example, the number and/or placement of rotors and motors is merely exemplary and any number and/or arrangement of rotors and motors may be used. In some embodiments, the cabin and/or the airframe may include or have attached other components in addition to and/or as an alternative to some of the components shown here. In some embodiments, the cabin, (primary) battery compartment, airframe, and/or other component has a different shape than that shown herein.

In this example, the ballistic parachute (204) is attached to cabin 202. Thus, when airframe (200) and cabin (202) separate, the cabin drifts downward at a slower rate due to the parachute while the airframe and its attached components free fall. Generally speaking, heavier and/or non-essential components are connected to the airframe (as opposed to the cabin) such that when the airframe and the cabin separate, the ballistic parachute (204) only has to slow the descent of the lighter and/or essential components in or otherwise attached to the cabin, such as the flight computer and any pilot (not shown in this figure). The cabin includes the flight computer (206) and an auxiliary battery (208) to supply power to the flight computer. This enables the flight computer to remain operable even after the battery compartment (210), which is coupled to the airframe (200), separates from the cabin (202) (which includes the flight computer (206)). To keep the weight of the cabin down (e.g., once separated from the airframe), the auxiliary battery may have a relatively small capacity (e.g., with enough capacity to support a few minutes of operation by the flight computer).

As described above, heavier and/or non-essential components are attached to the airframe as opposed to the cabin. When the flight computer determines it is safe to do so, the airframe and associated components are released, reducing the weight borne by the ballistic parachute so that the cabin and associated components (including any pilot) have a softer landing. For example, the battery compartment (210) is used to store the main batteries which are quite heavy. During an emergency landing, it is assumed that the main batteries are inoperable or are not needed and since the main batteries are relatively heavy, they are discarded with the airframe. Similarly, the motors (214) which power the rotors (212) are relatively heavy and in an emergency landing are assumed to be inoperable or not needed. As such, the motors are also discarded with the airframe when the airframe separates from the cabin.

Also as described above, release 216 may include active and/or passive release mechanisms. For example, release 216 may be a passive latch which, when released, permits airframe 200 and coupled components to free fall downward. Or, release 216 may be an explosive bolt which causes airframe 200 and its associated components to forcibly separate (e.g., downwards) from cabin 202 and its associated components.

In various embodiments, the cabin may be configured to hold a pilot and/or passenger (i.e., the cabin is a manned cabin) or alternatively the cabin may be configured to hold no pilots nor passengers (i.e., the cabin is an unmanned cabin).

The following figure illustrates an example of a landing zone. In some embodiments, the ground condition (e.g., detected at step 102 in FIG. 1) is associated with such a landing zone.

Figure 3:
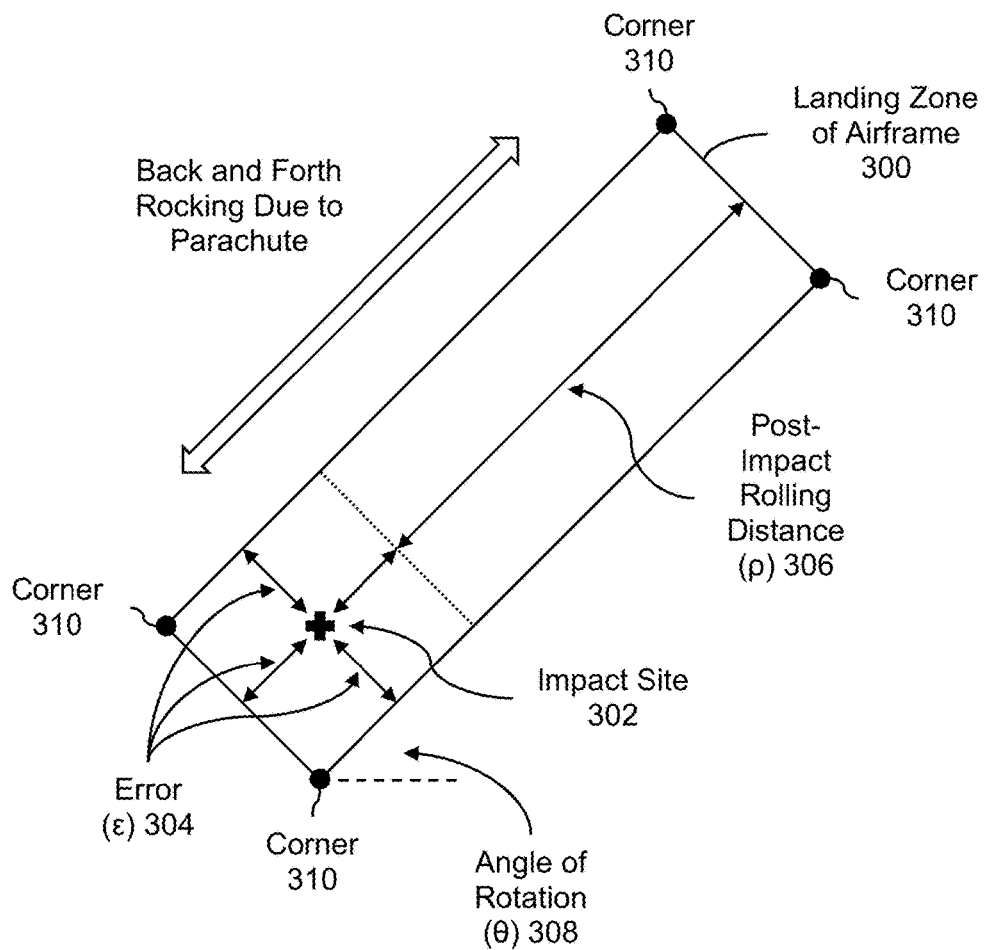
FIG. 3 is a diagram illustrating an embodiment of a landing zone.

FIG. 3 is a diagram illustrating an embodiment of a landing zone. In the example shown, the landing zone (300) of an airframe includes an impact site (302) where the airframe initially lands. The landing zone extends non-uniformly outward from the impact site. In part, this is to account for (e.g., positional) error associated with the impact site.

In some embodiments, the error (304) includes an error associated with estimating the position (e.g., in-air) of the aircraft before the airframe detaches from the cabin. For clarity, this type of error is referred to herein as an in-air positional error. For example, suppose a GPS system is used to determine the in-air position of the aircraft and that (civilian) GPS has a lateral accuracy of 7.8 meters (e.g., with a 95% confidence interval). In this example, the error may be at least 7.8 meters (e.g., plus any other error as will be described in more detail below). Generally speaking, this type of error (referred to herein as instrumentation error) may contribute towards the in-air positional error.

In some embodiments, the error (304) also includes an error associated with calculating the trajectory of the released airframe (referred to herein as a trajectory error). In one example, to speed up the trajectory calculation (e.g., since the aircraft is assumed to constantly be in motion due to the descent of the aircraft, as well as the rocking motion from being attached to the parachute), an equation or calculation is used to calculate the trajectory. An error introduced from a calculation (referred to herein as a calculation-introduced error) may contribute towards the trajectory error.

In some embodiments, instrumentation error contributes to the trajectory error. For example, suppose the outputs from a gyroscope (e.g., a first triplet of angular rates (e.g., degrees per second) associated with three axes (e.g., the pitch, roll, and yaw angles)) and an accelerometer (e.g., a second triplet, this time of accelerations, associated with the x, y, and z axes) are used as inputs to the calculation to calculate the trajectory of the airframe, if released. The gyroscope and/or accelerometer will have instrumentation errors associated with them, and those instrumentation errors may contribute toward the trajectory error. See, for example, the datasheet for the InvenSense MPU-6050, which is a 6-axis combined gyroscope and accelerometer in a single chip.

For simplicity, in some embodiments, it is assumed that the in-air positional error and the trajectory error are independent. In some such embodiments, this permits the error (304) to include a sum of the in-air positional error and the trajectory error.

Once the released airframe lands, the airframe may roll. This is accounted for by post-impact rolling distance (306). Note that in this example, the post-impact rolling distance (306) begins where the error ends such that the dimensions of the landing zone (300) are:

$$w=2\varepsilon+\rho$$

$$h=2\varepsilon$$

where $\varepsilon$ is the error (304) and $\rho$ is the post-impact rolling distance (306). It is noted that the rectangular shape shown here is merely exemplary and is not intended to be limiting. For example, the landing zone may be modeled using a circle or an ellipse, especially if some other shape simplifies some computation.

In some applications it is desirable to design the airframe to mitigate post-impact rolling. For example, less rolling may reduce the likelihood that someone is struck and/or property is damaged by the rolling airframe. From a performance point of view, a smaller landing zone (e.g., due to less rolling) may also reduce the amount of input data to gather and/or process.

In some such embodiments, because the airframe is designed to minimize rolling (e.g., the airframe has a substantially planar shape, as opposed to having a substantially spherical shape), the post-impact rolling distance (306) is assumed to be a constant, for example, associated with a fixed number of rolls. In one example, a number of emergency landings are simulated and the airframe is released from the cabin under a variety of conditions. These test results may be used to select a fixed (e.g., worst case scenario) post-impact rolling distance. Using a fixed value may be desirable since it simplifies the calculations associated with calculating the landing zone. Furthermore, if the error (304) is assumed to be constant (e.g., due to instrumentation error and calculation-introduced error), then the only calculation that needs to be done is the calculation of the impact site (302) as well as the angle of post-impact rolling (308). The angle of rotation (308) may be expressed in some other manner, such as a direction of rolling.

In this example, the landing zone (300) is shown from a bird's eye point of view, looking downward to the ground. In this particular example, it is assumed that the aircraft is rocking back and forth due to the parachute (e.g., assuming that the parachute has inflated). In this particular example, the landing zone corresponds to a release point or time when the aircraft is rocking upwards and rightwards, such that the post-impact rolling (306) extends upwards and rightwards. In this example, this is modeled as the landing zone being a rectangle (e.g., having the height and width described above) rotated to some degree or angle (308).

The following figure illustrates an example where the landing zone is projected to fall in an undeveloped lot in a residential area and illustrates a variety of techniques which may be used to detect a ground condition.

Figure 4:
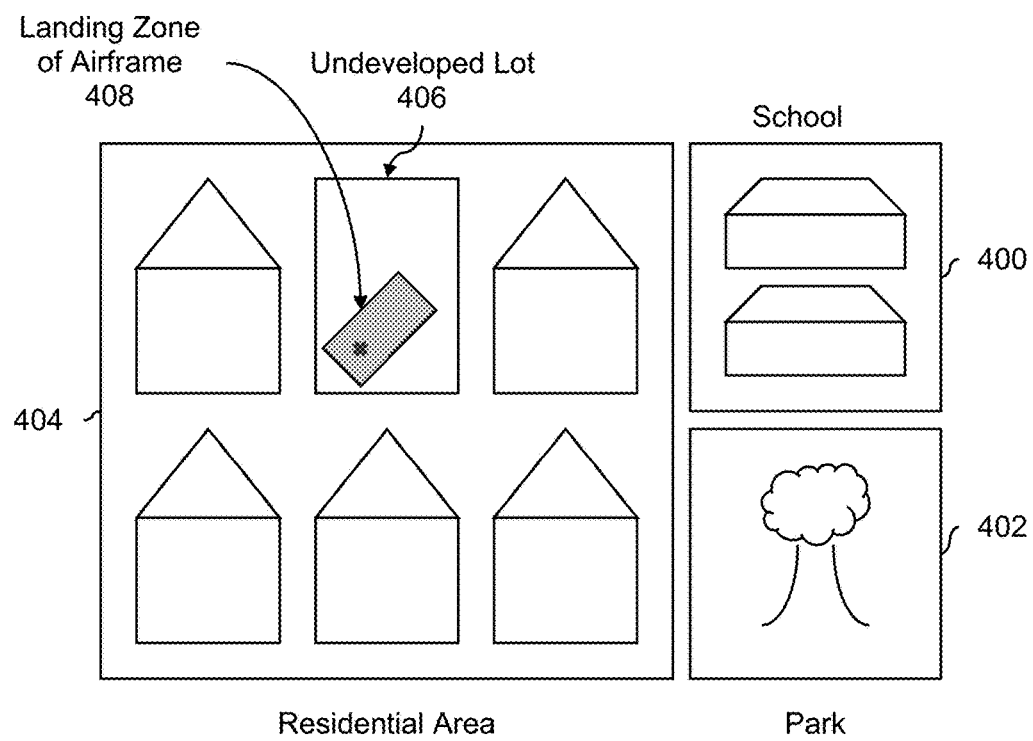
FIG. 4 is a diagram illustrating an embodiment of the landing zone of an aircraft in a mixed use area.

FIG. 4 is a diagram illustrating an embodiment of the landing zone of an aircraft in a mixed use area. In the example shown, there are three areas in the general vicinity of the landing zone of an airframe: a school (400), a park (402), and a residential area (404) which includes an undeveloped lot.

For the exemplary release time (not shown) associated with the landing zone of the airframe (408), the airframe is projected to land in undeveloped lot 406. In some embodiments, the aircraft (e.g., a drone) performs a real-time scan of the landing zone in order to detect a real-time ground condition, such as a real-time, flat surface (where a flat surface is a specific type of ground condition). In one example, the aircraft includes a LIDAR system which uses light (specifically, lasers) to determine a range (i.e., distance) from the aircraft. In one example, the aircraft constructs a real-time topological map of the landing zone. Generally speaking, the LIDAR system is used to determine when the (current) landing zone is completely flat and is therefore assumed to be unoccupied by people or property. For example, as the landing zone moves over residential area (404), school (400), and/or park (402) (e.g., due to the rocking motion from the parachute, and drift due to winds, etc.), the flight computer continually redirects or otherwise shifts the LIDAR system to scan the current landing zone. If the flight computer determines that the current landing zone is flat (and is therefore assumed to be unoccupied), then the airframe is released. In some embodiments, so long as all of the LIDAR data points or samples are within a certain range of altitudes, the landing zone is assumed to be sufficiently flat.

In some embodiments, a real-time scan of the landing zone is performed using thermal (e.g., infrared) scanning technology to determine the temperature at various points within the (current) landing zone. In this example, the ground condition which is detected includes one or more temperatures. As with the LIDAR system, the flight computer continually adjusts the area scanned by the thermal scanner to correspond to the landing zone as it sweeps across the residential area (404), school (400), and/or park (402). In this example, if all of the data points in the scan area (which includes the landing zone) have a temperature less than a typical body temperature (e.g., assuming a normal body temperature of 98.6° F., a cutoff of 95° F. may be used to have some margin), then it is assumed that the landing zone is unoccupied. In the event that occurs, the airframe is released.

In some embodiments, the ground condition which is determined is a recorded ground condition, meaning that the ground condition is recorded somewhere. For example, in this figure, the landing zone is over an undeveloped lot. Property tax records (which are publically accessible via a county clerk's office) contain both the assessed value of the land as well as the improvements (e.g., buildings on the land) for a particular parcel or lot. Undeveloped lots will have an assessed value for improvements which is relatively low or zero. As such, in some embodiments, records from a county clerk's office may be used to determine undeveloped lots which are assumed to have no people and/or property which might be damaged by a falling airframe. Other types of records which may be accessed and used include zoning maps (e.g., the zoning map for the city of Mountain View, Calif. shows agriculture zones, flood plain zones, and public facilities (including parks)), population density maps (e.g., available from the US Census Bureau), and online maps (e.g., Google Maps).

In some embodiments, the time of day and/or a light sensor may be used to further refine a decision when recorded information is used. For example, schools are more heavily populated during school hours and the time of day may be used to reduce the likelihood that someone is at the school when the flight computer is deciding whether to separate the airframe from the cabin over a school. In another example, parks tend to be more heavily populated during daylight hours. In some embodiments, the output of a light sensor (e.g., is it dark or light?) is used by the flight computer to decide whether to release the airframe onto a park. In some embodiments, weather information is used.

In some embodiments, the flight computer maintains a pre-determined list of landing zones which are suitable for landing (at least the cabin) in and/or for releasing the airframe over. For example, a server may aggregate a global list from the publically available sources described above. The flight computer may communicate with the server (e.g., using a cellular data network and/or WiFi) to download those locations which are within some range of the aircraft's current location. Naturally, this process may be repeated as the aircraft moves about.

In some embodiments, when the flight computer detects that the aircraft is in distress, the flight computer uses the list of pre-determined landing zones to steer the aircraft toward the nearest landing zone (e.g., before the ballistic parachute is deployed). For example, in FIG. 1, the flight computer may start doing this before step 100 when the aircraft is more maneuverable before the ballistic parachute is released. In some embodiments, the flight computer starts steering the aircraft towards the nearest landing zone when the batteries reach some critically low level and/or one of the motors or rotors stops working.

In at least some situations, school 400 and/or park 402 may be an acceptable landing zone for the released airframe. For example, as described above, the flight computer may use LIDAR or a thermal scanner to determine if school 400 or park 402 is unoccupied and (if so) release the airframe.

The following flowcharts describe some of the above examples more formally. First, a scanning process (e.g., using LIDAR or a heat sensor) to detect a ground condition and decide whether to detach the airframe from the cabin is described. Then, a process to use recorded information is described.

Figure 5:
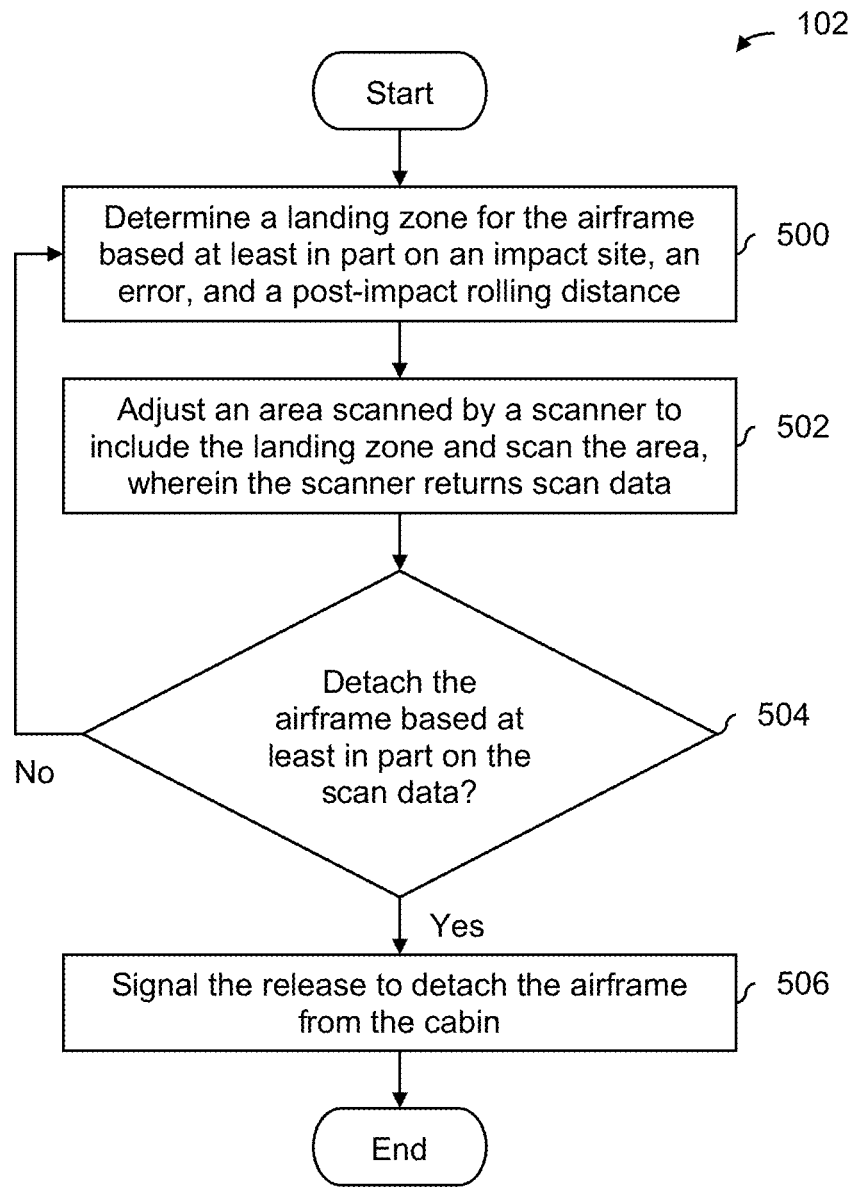
FIG. 5 is a flowchart illustrating an embodiment of a process to detect a ground condition and decide whether to detach an airframe using a scan.

FIG. 5 is a flowchart illustrating an embodiment of a process to detect a ground condition and decide whether to detach an airframe using a scan. In some embodiments, step 102 in FIG. 1 includes the process of FIG. 5.

At 500, a landing zone for the airframe is determined based at least in part on an impact site, an error, and a post-impact rolling distance. See, for example, landing zone 300 shown in FIG. 3 and the associated description.

At 502, an area scanned by a scanner is adjusted to include the landing zone and the area is scanned, wherein the scanner returns scan data. As described above, the scanner may be a LIDAR scanner or a heat sensor.

At 504, it is decided whether to detach the airframe based at least in part on the scan data. As described, if a LIDAR scanner is used, then the flight computer may decide to detach the airframe if the scan data indicates that the landing zone (at least) is flat (e.g., the altitudes of the surface data points associated with the scan area are within some range). A flat landing zone may indicate that there are no people or objects present.

In another example of step 504, a heat sensor is used and the flight computer decides to detach the airframe if all of the temperatures of the data points associated with the scan area are less than some threshold which in turn is less than the average body temperature.

If it is decided not to detach the airframe at 504, then a new landing zone is determined at 500, for example, based on the new in-air position of the airframe and/or the new tilt angle of the aircraft (e.g., due to the rocking motion from the parachute). If it is decided to detach the airframe at 504, then the release is signaled to detach the airframe from the cabin at 506.

In some embodiments, the scanner has a relatively long latency in returning scan data. If the latency is too long, by the time the flight computer has gathered the information necessary to make a decision at 504, the release point or time which corresponds to the landing zone has passed. In some such embodiments, the landing zone determined at step 500 is a projected landing zone, for example, associated with a future release point or time. This permits the scanner to return the scan data at 502 in enough time for the flight computer to make a decision at 504 before the release time or point (corresponding to the landing zone which was scanned) has been reached.

In some embodiments, a second or later scan of a second or later landing zone reuses scan data from a previous scan. As described above, some scanners may have relatively long latencies and reusing data from a previous scan may reduce the total amount of time it takes for the flight computer to collect the scan data in order to make a decision. Even if the latency is insignificant, reusing scan data may consume less power and/or processing resources.

The following figure illustrates an example of a process to use recorded information to detect a ground condition and decide whether to detach an airframe. In this example, the aircraft is assumed to be relatively small so the exemplary process below only checks a few points in the landing zone of the airframe, specifically the corners (e.g., since the process of obtaining and processing recorded information may be relatively slow). Since the dimensions of an airframe are assumed to be relatively small compared to the dimensions of the areas in typical records (e.g., the size of a parcel or lot in the case of property records, the size of a zoned area in a zoning map, etc.), it may be sufficient to check only some points as opposed to all data points in the landing zone. To put it another way, the expected dimensions are small enough where it is unlikely that a building (e.g., detected using some recorded information, such as a property tax record in a county clerk's office) could fit between the corners of a landing zone (associated with a detached airframe) without at least one of the corners detecting the building.

Figure 6:
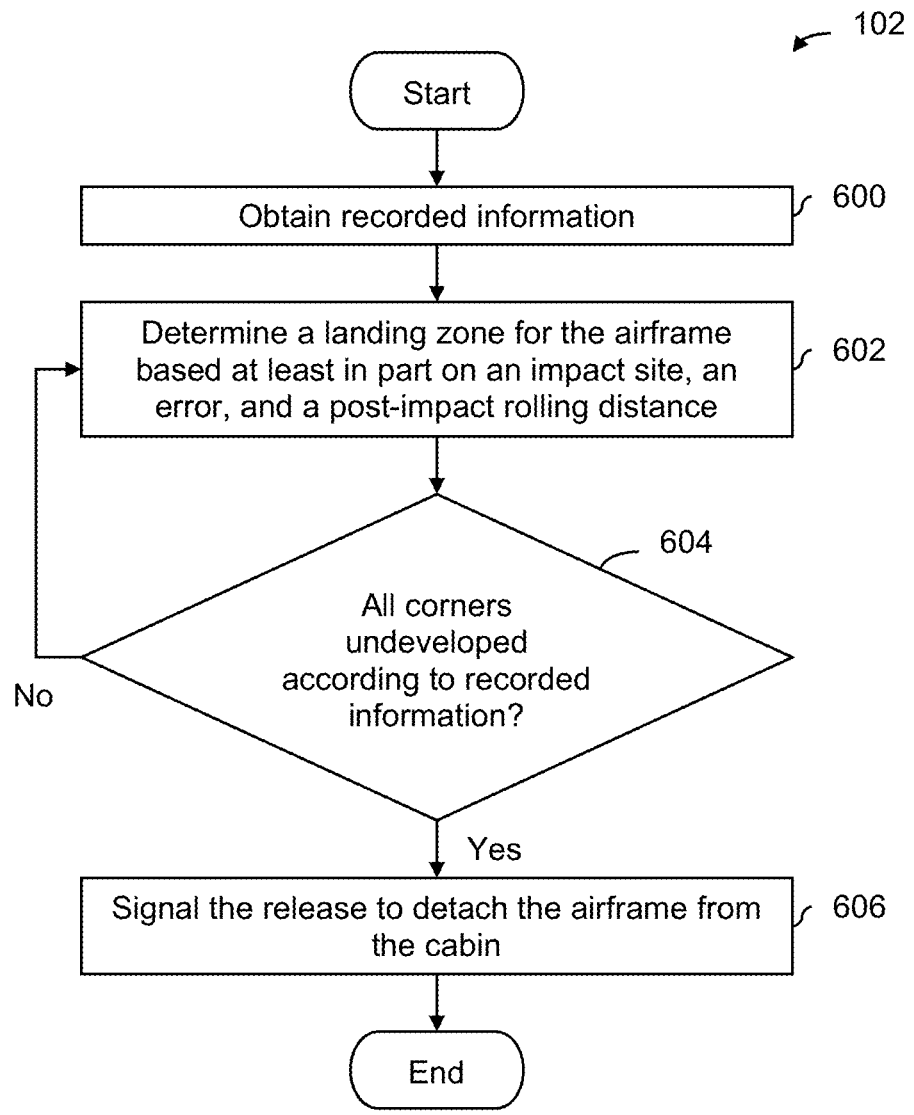
FIG. 6 is a flowchart illustrating an embodiment of a process to detect a ground condition and decide whether to detach an airframe based on recorded information and the corners of a landing zone.

FIG. 6 is a flowchart illustrating an embodiment of a process to detect a ground condition and decide whether to detach an airframe based on recorded information and the corners of a landing zone.

At 600, recorded information is obtained. In one example, a server obtains recorded information from one or more of the publically available sources described above. The server may combine the various sets of recorded information (e.g., all of the sources agree the data point corresponds to an undeveloped and/or lower population density location) into a set of data points where each data point has one of two values: either undeveloped (i.e., it is an acceptable place to land or on which to discard an airframe) or developed. To reduce the amount of information to manage and store, the data points may be spaced roughly the same distance as the smallest dimension of a typical landing zone (e.g., each data point associated with the recorded information is spaced 2ε apart, where ε is error 304 in FIG. 3).

In some embodiments, the flight computer obtains the recorded information from the server ahead of time (e.g., before the aircraft is in distress). In various embodiments, the aircraft provides its in-air position (or, at least the latitude and longitude) to the server (e.g., via a cellular data network and/or WiFi, if available) and the server returns recorded information for nearby locations or data points. Naturally, this download from the server may be repeated as the aircraft moves about.

As described above, in some embodiments, some information is used to supplement or augment the recorded information. For example, if the server knows a particular data point is associated with a school, the server may set the data point to an "undeveloped" value if the current time is outside of school hours. During school hours, the server may set the data point to "developed." Naturally, as time passes and the start (end) of the school day approaches, the server may update values appropriately and download the updated data points to the flight computer.

In another example, weather is used to supplement the recorded information associated with a park. For example, during inclement weather and/or when the sun is down, fewer people tend to go to the park. In some embodiments, the server uses the time of day (e.g., whether the sun is up or down) and/or the weather (e.g., Is it snowing? Is it raining? Is the temperature less than some threshold? Is the wind chill factor greater than some threshold?) to set the value of the data point appropriately. As above, the values of the data points may be updated as the weather changes and/or time passes and the updated data points may be downloaded to the flight computer.

At 602, a landing zone is determined for the airframe based at least in part on an impact site, an error, and a post-impact rolling distance. See, for example, landing zone 300 in FIG. 3 and the associated description.

At 604, it is decided if all of the corners are undeveloped according to the recorded information. For example, the latitude and longitude of each corner may be input to some lookup table which stores the recorded information. The lookup table selects the closest data point (or at least one of the four closest data points in order to simplify the mapping/selection process) from the recorded information and returns the corresponding value (e.g., developed or undeveloped). In the example of FIG. 3, corners 310 would be checked at this step.

If the flight computer decides that all corners are undeveloped at 604, then at 606, the release is signaled to detach the airframe from the cabin.

If the flight computer decides that not all of the corners are undeveloped at 604, then a new or next landing zone is determined at 602. That is, the current landing zone being evaluated is not appropriate for releasing an airframe onto, so the flight computer will not release the airframe (at least at this point in time).

Returning to the process of FIG. 1, in some embodiments, using a flight computer to detect a ground condition and decide whether to detach the airframe from the cabin at step 102 is performed while the aircraft is above some predefined or threshold altitude. For example, when an aircraft is relatively high up, releasing the airframe relatively early is beneficial because it reduces the amount of weight that is borne by the parachute, which in turn slows down the descent of the cabin and attached or included components. However, if the aircraft is fairly low to the ground, then releasing the airframe per the process of FIG. 1 may not necessarily be that beneficial (e.g., at least with respect to slowing down the descent with the parachute since the aircraft is too low to the ground for the parachute to fully inflate and slow the descent sufficiently) and/or may perform unnecessary checks. The following figure illustrates an example of a process for releasing an airframe in the event the altitude of the aircraft is at or below a threshold altitude and the airframe still has not been released. In this particular embodiment, the release mechanism is an active release mechanism (e.g., explosive bolts).

Figure 7:
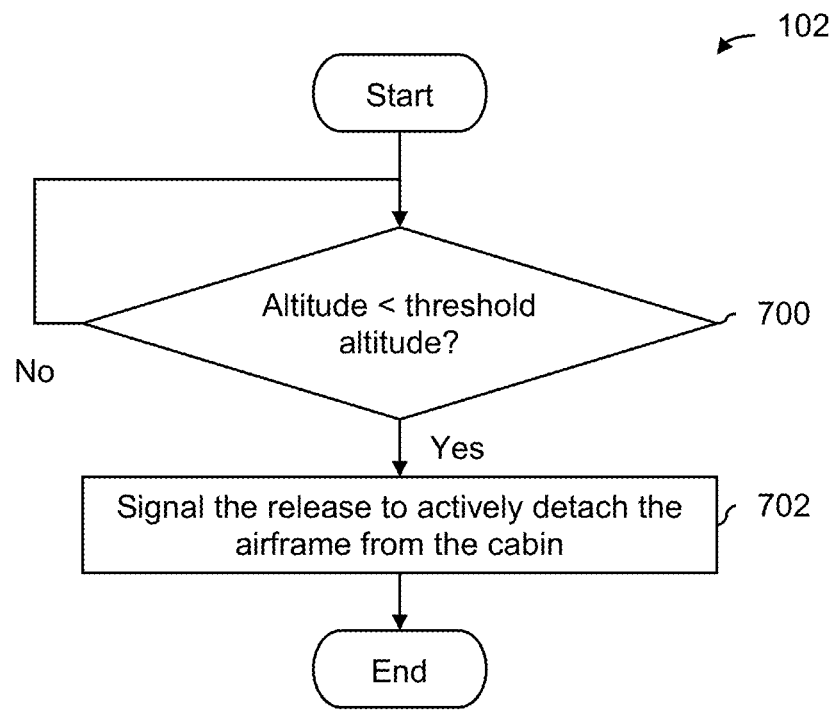
FIG. 7 is a diagram illustrating an embodiment of a process which triggers active detachment of the airframe from the cabin in the event the aircraft is below a threshold altitude.

FIG. 7 is a diagram illustrating an embodiment of a process which triggers active detachment of the airframe from the cabin in the event the aircraft is below a threshold altitude. In some embodiments, when a flight computer decides that an emergency landing is imminent, at higher altitudes, the flight computer uses some other process to decide whether to detach the airframe based on ground conditions (e.g., FIG. 5 and/or FIG. 6). However, if the aircraft descends below some threshold altitude (or the aircraft goes into distress at an altitude below the threshold altitude), then the process of FIG. 7 is used. To put it another way, at step 102 in FIG. 1, in some embodiments, the process of FIG. 7 is performed in parallel with the processes of FIG. 5 and/or FIG. 6.

At 700 it is decided if the altitude is less than a threshold altitude. For example, the threshold altitude may be on the order of 100 feet or less. If so, the release is signaled to actively detach the airframe from the cabin at 702. For example, explosive bolts or some other active release mechanism may be used to push the airframe downward and away from the cabin. If the altitude is greater than the threshold altitude at 700, then the check is repeated again (e.g., until the aircraft descends below the threshold altitude or the airframe is released as a result of the processes of FIG. 5 or FIG. 6).

Unlike the processes of FIG. 5 and FIG. 6, the process of FIG. 7 actively releases the airframe if the aircraft is below the threshold altitude (e.g., as opposed to checking if the landing zone is clear). This is because if the threshold altitude is quite low (if detached at that low altitude), the airframe would land at or very near the same impact site as the cabin. This means that anyone or anything that would have been hit by the detached airframe would most likely have been hit even if the airframe and cabin were not separated. To put it another way, at very low altitudes the utility of checking before releasing the airframe becomes questionable because the falling aircraft is about to impact the ground.

By actively releasing the airframe at the threshold altitude, it is hoped that the cabin experiences a little "lift" before hitting the ground (e.g., since the aircraft is about to hit the ground and there is little to lose by releasing the airframe, as described above). For every force there is an equal and opposite force and so it is hoped that the force of the airframe pushing off of the cabin (i.e., in the downward direction) from the explosive bolts or another active release mechanism will cause the cabin to experience a little lift right before the cabin hits the ground (e.g., softening the impact). Although it may be preferable for the airframe to detach at a higher altitude (since having the parachute bear a lighter load at a relatively high altitude may slow the cabin down more than this last-minute active release), if the aircraft gets close to the ground and still has not released the airframe, there may be nothing left to lose at this point.

Figure 8:
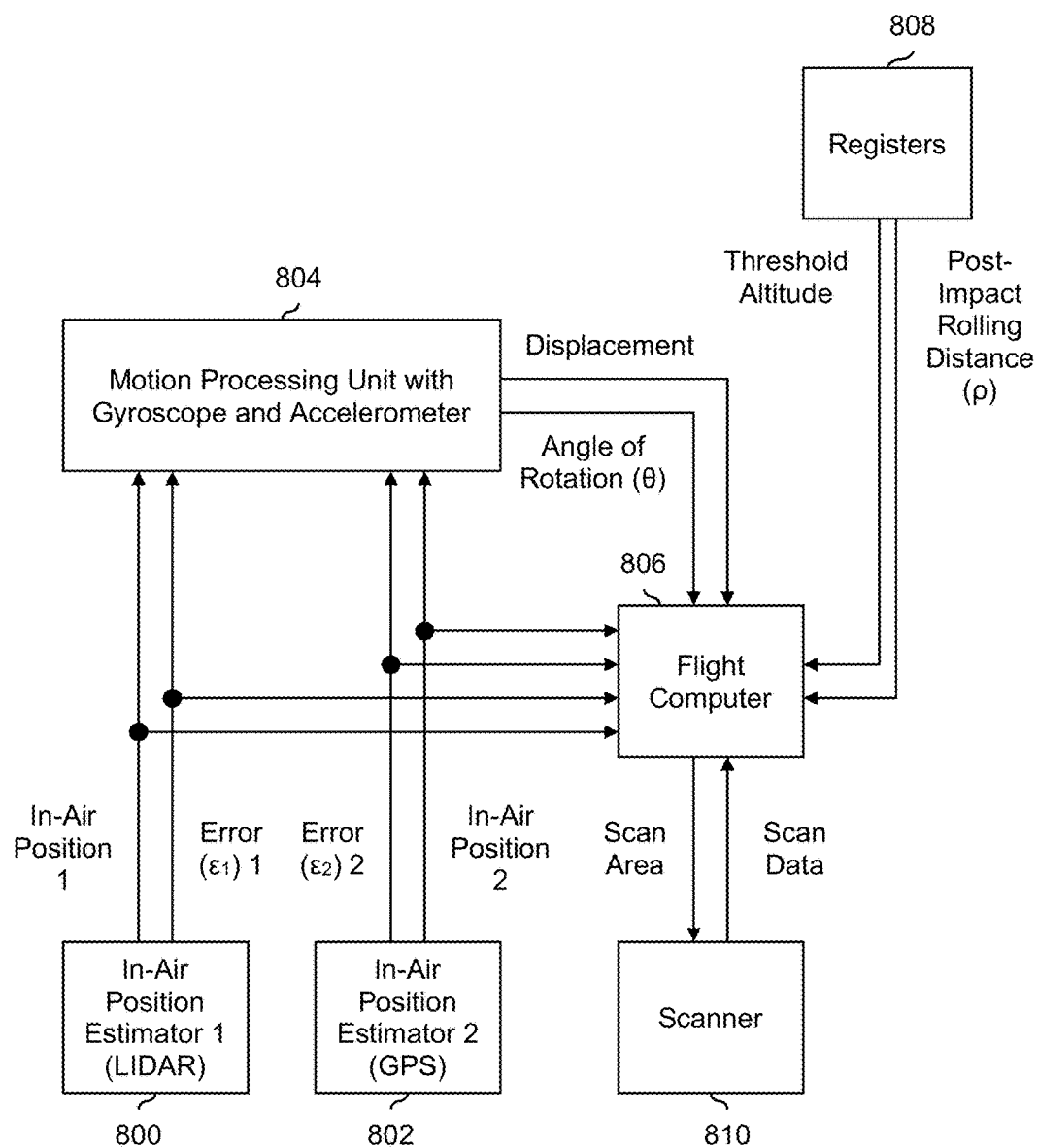
FIG. 8 is a diagram illustrating an embodiment of electrical components in an aircraft.

FIG. 8 is a diagram illustrating an embodiment of electrical components in an aircraft. This figure shows some example components which may perform the process(es) described above. For clarity, the components shown herein exchange values or signals which have been previously described above in other figures. Naturally, components may exchange other values or signals in other embodiments.

In the example shown, there are two components which estimate the in-air position of the aircraft. In this particular example, the first in-air position estimator (800) uses LIDAR to determine the altitude of the aircraft, as well as the topology of the ground beneath the aircraft. By comparing the topology of the ground beneath the aircraft against topological maps, the location (e.g., latitude and longitude) of the in-air position is determined. In one example, the topological map and the topology of the ground beneath the aircraft are correlated in order to determine the latitude and longitude of the in-air position, where the error for the in-air position depends upon the correlation value (e.g., as the correlation value goes up, the error goes down).

This in-air position (e.g., comprising of a latitude, longitude, and altitude) is passed to the motion processing unit with gyroscope and accelerometer (804) as well as the flight computer (806) as in-air position 1. The corresponding error (e.g., expressed in a unit of distance) is similarly passed to the motion processing unit with gyroscope and accelerometer (804) and the flight computer (806) as error 1.

Similarly, the second in-air position estimator (802) which in this example is a GPS system generates an in-air position (e.g., also comprising of a latitude, longitude, and altitude) and corresponding error. These values are similarly passed to motion processing unit with gyroscope and accelerometer (804) as well as the flight computer (806).

One example of a component which may be used to implement motion processing unit with gyroscope and accelerometer (804) is the InvenSense MPU-6050. The InvenSense MPU-6050 has a built-in motion processing unit which may be used to offload processing from flight computer 806. In this example, the motion processing unit calculates the angle of rotation (see, e.g., angle of rotation 308 in FIG. 3) and the displacement. In this example, the displacement is the difference in latitude and longitude between the in-air position of the aircraft and the impact site of a released airframe (see, e.g., impact site 302 in FIG. 3). As described above, the motion processing unit may use a some equation or model to determine the displacement and/or angle of rotation (e.g., based on the information from the gyroscope and/or accelerometer). Alternatively, the motion processing unit may calculate the displacement and/or angle of rotation.

The displacement and angle of rotation are passed from motion processing unit with gyroscope and accelerometer (804) to flight computer 806 (e.g., which may be implemented using a microprocessor). In this example, the flight computer selects the in-air position with the lowest error value. The displacement is then applied to the latitude and longitude of the selected in-air position in order to obtain the impact site of the released airframe (not shown). Using the impact site, the error corresponding to the selected in-air position, the post-impact rolling distance (in this example, a fixed value obtained from registers 808), and the angle of rotation, the flight computer can determine the landing zone of the airframe (see, e.g., landing zone 300).

With the (projected) landing zone of the airframe known, the flight computer can direct the scanner to scan an area that includes the (projected) landing zone of the airframe. As described above, in various embodiments, scanner 810 may comprise LIDAR or a heat sensor. Scanner 810 returns scan data to flight computer 806, which determines whether it is safe to release the airframe based on the scan data.

If the altitude of the aircraft (e.g., from the selected in-air position) is less than some threshold altitude (e.g., relatively low to the ground, where the value is obtained from registers 808) and the airframe still has not been released, then flight computer 806 may decide to actively detach the airframe from the cabin (e.g., using explosive bolts). See, for example, the process of FIG. 7.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
  deploying a ballistic parachute associated with an aircraft, wherein:
    the aircraft includes a first part and a second part;
    the first part of the aircraft and the second part of the aircraft are detachably coupled to each other when the ballistic parachute is deployed; and
    the ballistic parachute is coupled to the first part of the aircraft;
  determining a landing zone associated with the second part of the aircraft;
  deciding whether to decouple the first part of the aircraft and the second part of the aircraft from each other, including by deciding whether the landing zone associated with the second part of the aircraft is inhabited; and
  in response to deciding to decouple the first part of the aircraft and the second part of the aircraft from each other, decoupling the first part of the aircraft and the second part of the aircraft from each other.

2. The method recited in claim 1, wherein deciding whether the landing zone associated with the second part of the aircraft is inhabited includes:
  scanning the landing zone using a thermal sensor in order to obtain a plurality of temperatures associated with the landing zone; and
  in the event it is determined that at least one temperature in the plurality of temperatures associated with the landing zone is greater than a threshold, deciding that the landing zone is inhabited.

3. The method recited in claim 1, wherein:
  the landing zone is a projected landing zone associated with a future decoupling of the first part of the aircraft and the second part of the aircraft from each other; and
  deciding whether the projected landing zone associated with the second part of the aircraft is inhabited includes:
    scanning the projected landing zone using a thermal sensor in order to obtain a plurality of temperatures associated with the projected landing zone; and
    in the event it is determined that at least one temperature in the plurality of temperatures associated with the projected landing zone is greater than a threshold, deciding that the projected landing zone is inhabited.

4. A system, comprising:
  a processor; and
  a memory coupled with the processor, wherein the memory is configured to provide the processor with instructions which when executed cause the processor to:
    deploy a ballistic parachute associated with an aircraft, wherein:
      the aircraft includes a first part and a second part;
      the first part of the aircraft and the second part of the aircraft are detachably coupled to each other when the ballistic parachute is deployed; and the ballistic parachute is coupled to the first part of the aircraft;

determine a landing zone associated with the second part of the aircraft;

decide whether to decouple the first part of the aircraft and the second part of the aircraft from each other, including by deciding whether the landing zone associated with the second part of the aircraft is inhabited; and in response to deciding to decouple the first part of the aircraft and the second part of the aircraft from each other, decouple the first part of the aircraft and the second part of the aircraft from each other.

5. The system recited in claim 4, wherein the instructions for deciding whether the landing zone associated with the second part of the aircraft is inhabited include instructions for:

scanning the landing zone using a thermal sensor in order to obtain a plurality of temperatures associated with the landing zone; and in the event it is determined that at least one temperature in the plurality of temperatures associated with the landing zone is greater than a threshold, deciding that the landing zone is inhabited.

6. The system recited in claim 4, wherein:

the landing zone is a projected landing zone associated with a future decoupling of the first part of the aircraft and the second part of the aircraft from each other; and the instructions for deciding whether the projected landing zone associated with the second part of the aircraft is inhabited include instructions for:

scanning the projected landing zone using a thermal sensor in order to obtain a plurality of temperatures associated with the projected landing zone; and in the event it is determined that at least one temperature in the plurality of temperatures associated with the projected landing zone is greater than a threshold, deciding that the projected landing zone is inhabited.

7. A computer program product, the computer program product being embodied in a non-transitory computer readable storage medium and comprising computer instructions for:

deploying a ballistic parachute associated with an aircraft, wherein:

the aircraft includes a first part and a second part;

the first part of the aircraft and the second part of the aircraft are detachably coupled to each other when the ballistic parachute is deployed; and the ballistic parachute is coupled to the first part of the aircraft;

determining a landing zone associated with the second part of the aircraft;

deciding whether to decouple the first part of the aircraft and the second part of the aircraft from each other, including by deciding whether the landing zone associated with the second part of the aircraft is inhabited; and in response to deciding to decouple the first part of the aircraft and the second part of the aircraft from each other, decoupling the first part of the aircraft and the second part of the aircraft from each other.

8. The computer program product recited in claim 7, wherein the computer instructions for deciding whether the landing zone associated with the second part of the aircraft is inhabited include computer instructions for:

scanning the landing zone using a thermal sensor in order to obtain a plurality of temperatures associated with the landing zone; and in the event it is determined that at least one temperature in the plurality of temperatures associated with the landing zone is greater than a threshold, deciding that the landing zone is inhabited.

9. The computer program product recited in claim 7, wherein:

the landing zone is a projected landing zone associated with a future decoupling of the first part of the aircraft and the second part of the aircraft from each other; and the computer instructions for deciding whether the projected landing zone associated with the second part of the aircraft is inhabited include computer instructions for:

scanning the projected landing zone using a thermal sensor in order to obtain a plurality of temperatures associated with the projected landing zone; and in the event it is determined that at least one temperature in the plurality of temperatures associated with the projected landing zone is greater than a threshold, deciding that the projected landing zone is inhabited.

* * * * *